US011377036B2

(12) United States Patent
Scaringe et al.

(10) Patent No.: US 11,377,036 B2
(45) Date of Patent: Jul. 5, 2022

(54) AUTOMOTIVE VEHICLE THROUGH BODY STORAGE WITH COMBINATION DOOR AND STEP

(71) Applicant: Rivian IP Holdings, LLC, Plymouth, MI (US)

(72) Inventors: Robert J. Scaringe, Plymouth, MI (US); Mason Verbridge, Canton, MI (US); Jared Odle, Westland, MI (US); Brian Gase, Ypsilanti, MI (US); William Kirk Robinson, Ann Arbor, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 5 days.

(21) Appl. No.: 17/007,867

(22) Filed: Aug. 31, 2020

(65) Prior Publication Data

US 2021/0053497 A1 Feb. 25, 2021

Related U.S. Application Data

(63) Continuation of application No. 16/111,570, filed on Aug. 24, 2018, now Pat. No. 10,974,653.

(51) Int. Cl.
*B60R 5/00* (2006.01)
*B60J 5/04* (2006.01)
*B60R 3/00* (2006.01)
*B60R 16/023* (2006.01)
*B60J 10/80* (2016.01)

(52) U.S. Cl.
CPC .............. *B60R 5/00* (2013.01); *B60J 5/0491* (2013.01); *B60J 10/80* (2016.02); *B60R 3/00* (2013.01); *B60R 16/023* (2013.01)

(58) Field of Classification Search
CPC .... B60R 5/00; B60R 3/00; B60R 3/02; B60R 5/04; B60R 5/0491; B60R 5/0458
USPC ........... 296/37.6, 163, 164.1; 280/163, 164.1
See application file for complete search history.

(56) References Cited

U.S. PATENT DOCUMENTS

| | | | | |
|---|---|---|---|---|
| 3,485,522 A | * | 12/1969 | Reinarts | B60P 3/423 296/10 |
| 3,716,254 A | * | 2/1973 | Tarvin | B60R 3/007 280/166 |
| 4,917,430 A | * | 4/1990 | Lawrence | B60R 7/04 224/281 |

FOREIGN PATENT DOCUMENTS

FR      2845878 B1 *  7/2005  ........... A47B 88/994

\* cited by examiner

*Primary Examiner* — Dennis H Pedder
(74) *Attorney, Agent, or Firm* — Clements Bernard Baratta; Christopher L. Bernard

(57) ABSTRACT

An automotive vehicle with a storage compartment has a cabin, a set of rear wheels located behind the cabin, a cargo space, and a closable integrated storage compartment located adjacent to the cabin, rearward of a rear-most seat of the automotive vehicle, and forward of the set of rear wheels. At least a portion of the storage compartment is positioned forward of a forward wall of the cargo space. The storage compartment has at least one sidewall enclosing an interior portion of the storage compartment and extending from a first side panel at a first side of the automotive vehicle toward a second side of the automotive vehicle, a first opening to the storage compartment at the first side of the automotive vehicle, and a first door at the first opening. The first door has a first step member with a horizontal step surface when open.

14 Claims, 15 Drawing Sheets

AUTOMOTIVE VEHICLE THROUGH BODY STORAGE WITH COMBINATION DOOR AND STEP

The present disclosure is a continuation of U.S. patent application Ser. No. 16/111,570, filed on Aug. 24, 2018, and entitled "Automotive Vehicle Through Body Storage with Combination Door and Step," the contents of which are incorporated by reference in their entirety.

TECHNICAL FIELD

Background

Electric vehicles, including hybrid vehicles, are of great interest for transportation applications and can provide benefits of low or zero emissions, quiet operation and reduced dependence on fossil fuels. However, conventional electric vehicles have relatively low rates of utilization. One of the challenges associated with electric vehicles observed by the present inventors is effective configuration of storage space for such vehicles.

The present inventors have observed a need for enhancing efficient utilization of storage space in automotive vehicles including electric vehicles. Exemplary approaches described herein may address such needs.

SUMMARY

An automotive vehicle with a storage compartment is disclosed, having a cabin, a set of rear wheels located behind the cabin, a cargo space, and a closable integrated storage compartment assembly located adjacent to the cabin, rearward of a rear-most seat of the automotive vehicle, and forward of the set of rear wheels. The storage compartment has at least one sidewall enclosing an interior portion of the storage compartment and extending from a first side panel at a first side of the automotive vehicle toward a second side of the automotive vehicle, a first opening to the storage compartment at the first side of the automotive vehicle, and a first door at the first opening. The first door has a first step member with a horizontal step surface when open, e.g., to facilitate access to a roof of the automotive vehicle. At least a portion of the storage compartment is positioned forward of a forward wall of the cargo space. Related apparatus, systems, techniques and articles are also described.

The automotive vehicle may have a latch mechanism to secure and lock the first door in a closed position. The first door may have a second step member positioned at a second height different from a first height of the first step member. The storage compartment assembly may have a second door at a second opening of the storage compartment, the second opening at the second side of the automotive vehicle. The automotive vehicle may have a safety lock that prevents vehicle operation when the first door is open. The first door may be capable of opening downward, such that when open, the first door is substantially parallel to a ground surface. The automotive vehicle may be, e.g., a truck such as a pickup truck, and the storage compartment may be located such that it is not positioned under a truck bed of the truck. The storage compartment may have a weatherproof seal between the first door and the first opening. The storage compartment may include a forward door to permit access to the storage compartment from the cabin. The storage compartment may have a rear door to permit access to the storage compartment from a cargo space located rearward of the storage compartment.

A closable and lockable storage compartment assembly for an automotive vehicle is also disclosed. The storage compartment assembly comprises at least one wall enclosing a storage space, extends through a width of the automotive vehicle, and is located adjacent to a vehicle cabin and rearward of a rear-most seat of the automotive vehicle. At least a portion of the storage space is located forward of a forward wall of a cargo space of the automotive vehicle. The storage compartment also includes a first opening at a first side of the automotive vehicle, a second opening at a second side of the automotive vehicle, a first door attached to the automotive vehicle at the first opening, and a second door attached to the automotive vehicle at the second opening, a first mechanism configured to open and close the first door, and a second mechanism configured to open and close the second door. The first and second mechanisms may be, for example, hinge mechanisms or slider mechanisms, or a combination thereof. The first door and/or second door may be configured to open downward to provide a weight-bearing step configured to support a load of up to 500 lbs. The first door and/or second door may have a storage receptacle. The storage space may be located such that it is not positioned in the cabin. The automotive vehicle may have a wiring harness supplying electrical power to the first door. The automotive vehicle may have sensors in electrical communication with the wiring harness, e.g., to detect open and closed positions of the first and/or second doors. The storage compartment may include a forward door to permit access to the storage space from the cabin. The storage compartment may have a rear door to permit access to the storage space from a cargo space located rearward of the storage compartment.

A combination step and storage assembly for an automotive vehicle is also disclosed. The step and storage assembly includes at least one wall enclosing a storage space extending into a body of an automotive vehicle from a side of the automotive vehicle, the side of the automotive vehicle extending between a front of the automotive vehicle and a rear of the automotive vehicle, a first door configured to access the storage space at the side of the automotive vehicle, and a weight-bearing horizontal step provided by the first door to facilitate access to a roof of the automotive vehicle. The automotive vehicle may have a front access door to the storage space from the cabin. The automotive vehicle may have a rear access door to the storage space from a cargo space located rearward of the storage space. A volume of the storage space may be between 6 cubic feet and 15 cubic feet. The first door may be capable of opening sideways, such that when open, a seat surface of the first door is substantially perpendicular to a ground surface. The automotive vehicle may be a unibody truck comprising a roof and a cargo bed.

The subject matter described herein may provide various technical advantages, including the following. Exemplary integrated storage compartments as disclosed herein may provide useful, unobstructed storage space for substantially a full width of an automotive vehicle that does not interfere with occupant seating. Exemplary door(s) that seal the exemplary integrated storage compartment may be configured to serve as horizontal steps when open, i.e., on which a user may step, to improve accessibility of items located on the roof or in the trunk or in a cargo bed or truck bed of the automotive vehicle, e.g., to provide an easy path to step into a storage bed of the automotive vehicle from the ground. Exemplary door(s) that seal the exemplary integrated storage compartment may be configured to provide horizontal exterior seating surfaces (i.e., exterior to the vehicle cabin)

for occupants when the automotive vehicle is parked. Exemplary integrated storage compartments as disclosed herein may increase the storage space and enhance utilization of space available of an automotive vehicle including an electric vehicle.

Exemplary details and variations of the subject matter described herein are set forth in the accompanying drawings and the description below. Other features and advantages of the subject matter described herein will be apparent from the description and drawings, and from the claims.

DETAILED DESCRIPTION

An exemplary integrated side-access storage compartment of an automotive vehicle is disclosed herein according to various nonlimiting examples. For any examples, the automotive vehicle may be a passenger vehicle, a pickup truck, a sport utility vehicle (SUV), etc., each of which may have one or more rows of seats to accommodate human passengers. The storage compartment may be integrated into the body of the automotive vehicle. The storage compartment may have a storage compartment door that may open sideways or downward. The storage compartment door may incorporate a weight-bearing (load-bearing) step on which a user may sit or on which a user may step to facilitate user access to a roof or cargo space (e.g., cargo bed, which may also be referred to as a truck bed) of the automotive vehicle. The storage compartment may extend though the full width of the automotive vehicle. The storage compartment may be located adjacent to a cabin of the automotive vehicle and integrated into a body thereof, and may be located rearward of a rear-most seat of the automotive vehicle and forward of a set of rear wheels, wherein at least a portion of the storage compartment may be positioned forward of a forward wall of a cargo space. The storage compartment may include a forward door to permit access to the storage compartment from the cabin. The storage compartment may also include rear door to permit access to the storage space from the cargo space located rearward of the storage space. Other exemplary aspects are also disclosed. Like reference symbols in the various drawings indicate like elements.

Figure 1:
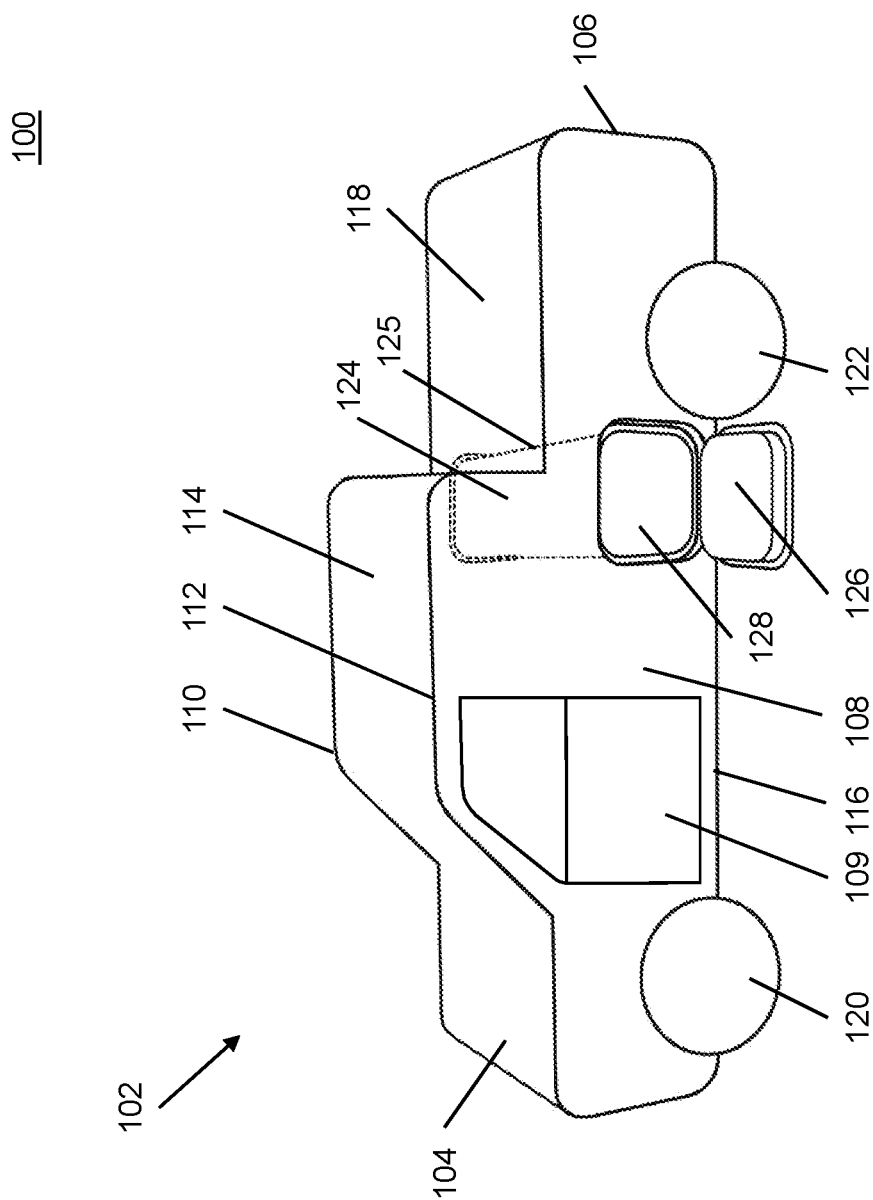
FIG. 1 is a diagram illustrating an example of a vehicle with a side-access storage compartment, which may also be referred to herein as a side bin or a storage bin.

FIG. 1 is a diagram illustrating an example 100 of an automotive vehicle 102, such as an electric vehicle, with a side-access storage compartment, which may also be referred to as a storage space, a side bin, or storage bin. An automotive vehicle 102 may have a front portion 104 and a rear portion 106. A cabin 108 is typically located between the front and rear portions of the vehicle. The cabin 108 may include entry doors 109. There may be one, two, three, four, or five or more entry doors 109 to the cabin 108, which may contain one or more rows of seating for human occupants. Automotive vehicle 102 has a right side 110 and a left side 112. Left side 112 may be referred to as a driver side of the vehicle, and right side 110 may be referred to as a passenger side of the vehicle. In cases where the vehicle is an autonomous vehicle that does not require or is not configured for a human driver, the left side of the vehicle may still be referred to as a driver side as a matter of convenience. One or more of the entry doors may be located on the left side 112 of the vehicle, and one or more entry doors may be located on the right side 110 of the vehicle.

Automotive vehicle 102 typically has a roof 114. Roof 114 may have racks or other equipment for storage (not shown). Automotive vehicle 102 may have a chassis or unibody 116. Automotive vehicle 102 may have a cargo space, such as cargo bed or truck bed 118 or, alternatively, a trunk. Cargo bed 118 is typically located at the rear portion 106 of the vehicle. Automotive vehicle 102 may have one or more front wheels 120 and one or more rear wheels 122. Automotive vehicle 102 may be a unibody truck, which may have a storage bed. The body of the automotive vehicle 102 may be constructed of steel alloy and/or aluminum alloy or other materials as conventionally known in the art.

In an example, automotive vehicle 102 may have a side-access storage compartment 124, which may also be referred to as a storage bin or side bin. Storage compartment 124 may be closable and lockable. Storage compartment 124 may be integrated into a body of the automotive vehicle. Storage compartment 124 may be located toward the rear of the vehicle cabin 108, e.g., rearward of a rear-most seat of the automotive vehicle. As with other examples disclosed herein at least a portion of the storage compartment 124 may be located forward of a forward wall of the cargo bed 118, or cargo space, or trunk in examples where a trunk is utilized, and preferably at least one-half the volume of the storage compartment 124 is located forward of a forward wall of such a rear cargo space. Storage compartment 124 may be located forward of the rear wheel 122 and may have one or more openings 128. An opening 128 to the storage compartment 124 may be at the left side 112 of the automotive vehicle 102. Another opening 128 to the storage compartment 124 may be at the right side 110 of the automotive vehicle 102. Storage compartment 124 may extend through the full width of the vehicle 102, such that it has openings 128 on both the left side 112 of the automotive vehicle 102 and on the right side 110 of the automotive vehicle 102.

Some of openings 128 or each of openings 128 may have a storage compartment door 126. Storage compartment 124 may include at least one sidewall 125 enclosing an interior portion of the storage compartment and extending from a first side panel at a first (e.g., left) side of the automotive vehicle to a second side panel at a second (e.g., right) side of the automotive vehicle. If storage compartment 124 extends through the full width of the vehicle 102, or extends between two storage compartment openings, then it may have doors 126 on both ends to cover each of the openings 128. Storage compartment 124 may be lockable. Volume of the storage space may be between 2 cubic feet and 10 cubic feet, between 6 cubic feet and 15 cubic feet, between 10 cubic feet and 50 cubic feet, or between 20 cubic feet and 200 cubic feet.

Figure 2:
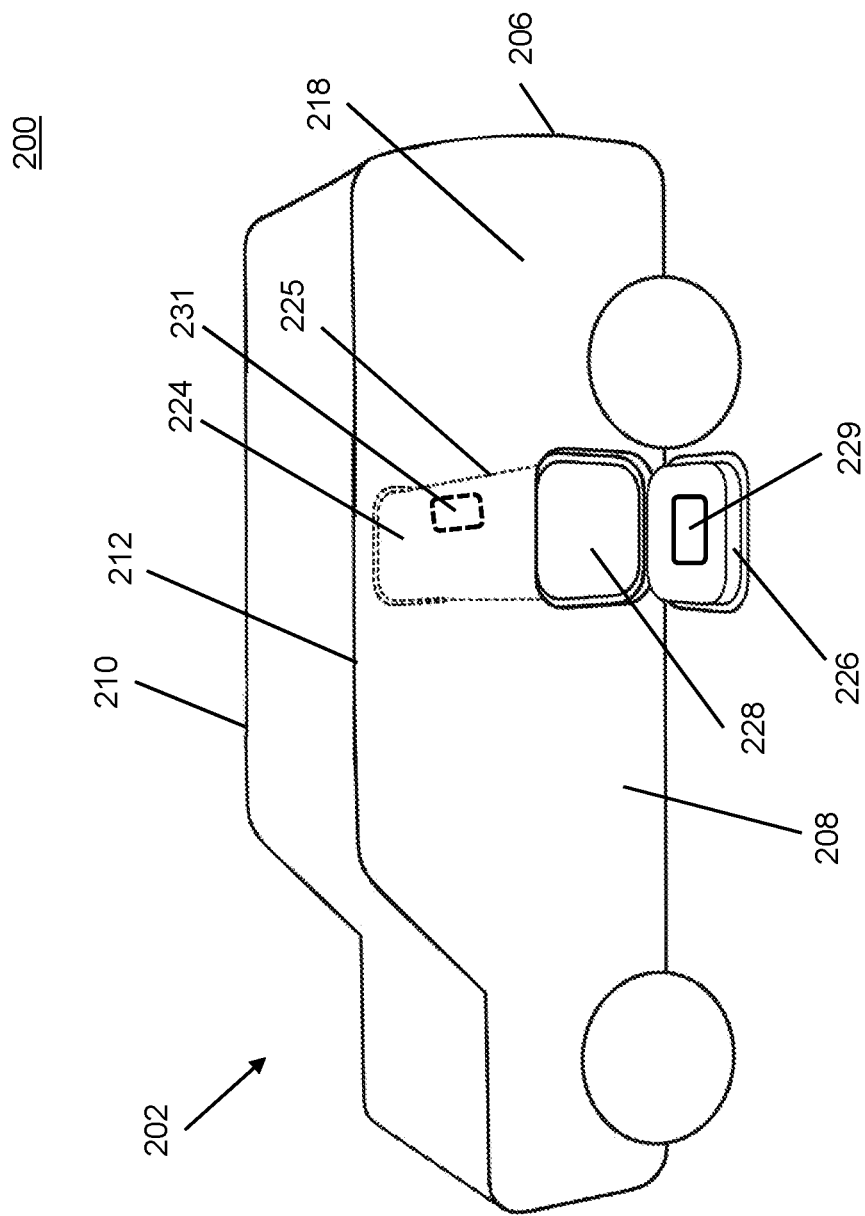
FIG. 2 is a diagram illustrating another example of a vehicle with a side-access storage compartment.

FIG. 2 is a diagram illustrating another example 200 of an automotive vehicle 202 with a side-access storage compartment. Automotive vehicle 202 in this example may have a rear portion 206 with a rear cargo space (trunk) 218, e.g., behind a row of occupant seating, that may be internal to the rear portion 206. Rear cargo space 218 may be referred to as a trunk or as a cargo bed. As in this example, the rear portion 206 of the automotive vehicle 202 may have no trunk. Automotive vehicle 202 may have a storage compartment 224. Storage compartment 224 may include at least one sidewall 225 enclosing an interior portion of the storage compartment 224 and extending from a first side panel at a first (e.g., left) side of the automotive vehicle to a second side panel at a second (e.g., right) side of the automotive vehicle. Storage compartment 224 may have one or more openings 228. Each of openings 228 may have a storage compartment door 226. One opening 228 of storage compartment 224 may be on the left side 212 of the automotive vehicle 202. Storage compartment 224 may extend through the full width of the automotive vehicle 202, such that it has openings 228 on both the left side 212 of the automotive vehicle 202 and on the right side 210 of the automotive vehicle 202. If storage compartment 224 extends through the full width of the automotive vehicle 202, then it may have doors 226 on both ends to cover each of the openings 228. One or more of doors 226 may have a storage receptacle 229, which may include a cover such as a hinged cover. Storage compartment 224 may have an entry door 231 from a trunk space 218. Storage compartment 224 may have a storage space located adjacent to a vehicle cabin 208 and forward of a cargo space 218 of the automotive vehicle 202, e.g., such that at least a portion of the storage compartment is located forward of a forward wall of the cargo space 218. In an example, a seat-back of a rear seat of the automotive vehicle 202 may serve as a forward wall of the cargo space. In the example of FIG. 2, the cargo space may be located at the rear of the automotive vehicle 202 and span an area behind and above the rear wheels of the automotive vehicle 202.

Figure 3:
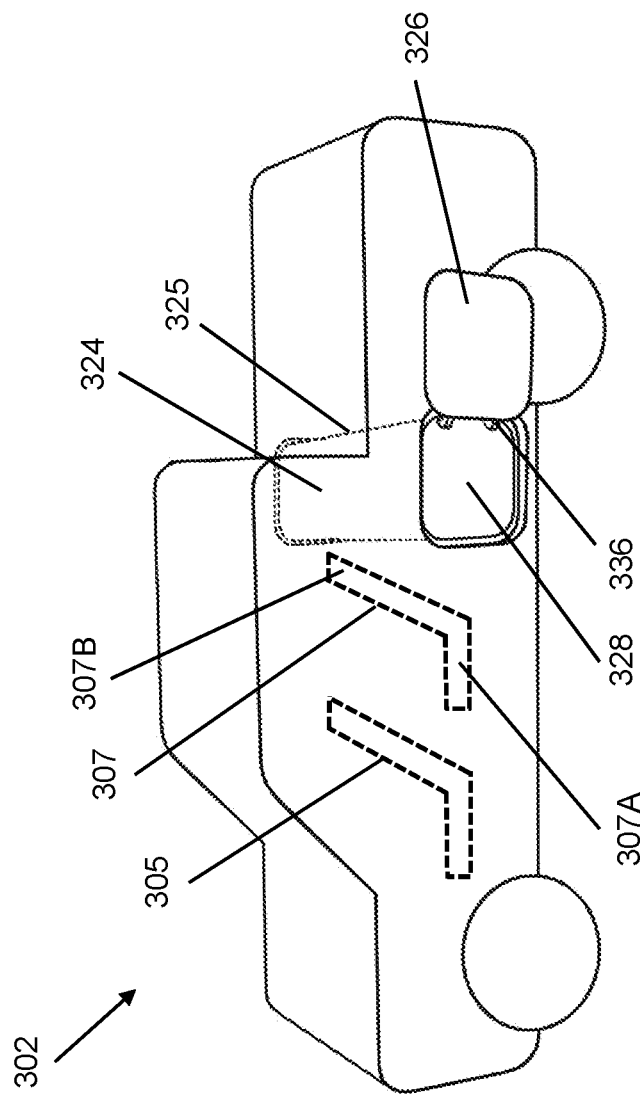
FIG. 3 is a diagram illustrating an example of a vehicle with a side-access storage compartment having a sliding door.

FIG. 3 is a diagram illustrating an example 300 of an automotive vehicle 302 with a storage compartment having a storage compartment door that opens laterally while retaining an upright, vertical orientation. In this example, automotive vehicle 302 may have a storage compartment 324. Storage compartment 324 may include at least one sidewall 325 enclosing an interior portion of the storage compartment 324 and extending from a first side panel at a first (e.g., left) side of the automotive vehicle to a second side panel at a second (e.g., right) side of the automotive vehicle. Storage compartment 324 may have one or more openings 328. Each of the openings 328 may have a storage compartment door 326. Diagram 300 shows the storage compartment door 326 in an open position. When storage compartment door 326 is in an open position, opening 328 is open and accessible. When storage compartment door 326 is open, it may be possible to place items for storage into the storage compartment 324, or to remove items from the storage compartment 324. Diagram 300 shows an example where the storage compartment door 326 in its open position is located to the rear of the opening 328. Mechanism 336 allows for opening and closing of the storage compartment door 326. Mechanism 336 may be a sliding mechanism (e.g., a powered sliding mechanism such as conventionally used in minivan side doors), or a hinge, or a set of hinges, or another opening mechanism. Storage compartment door 326 in its open position may have its exterior surface facing away from the vehicle. This may occur, for example, when mechanism 336 is a sliding mechanism. Storage compartment door 326 in its open position may have its exterior surface facing toward the vehicle. This may occur, for example, when mechanism 336 is a hinge mechanism. The automotive vehicle 302 may have one or more front seats 305 and may have one or more rear seats 307. The automotive vehicle 302 may have a cargo space behind a rear seat 307 that is in addition to and different from the storage compartment 324, as is the case with other examples disclosed herein. The automotive vehicle 302 may also have a cargo space behind a front seat 305 and in front of a rear seat 307 that is in addition to and different from the storage compartment 324, as is the case with other examples disclosed herein.

In some examples, storage compartment 324 may be positioned rearward of a seat 307 that has a back 307A and a base 307B. Seat 307 may be a rear seat of the automotive vehicle, or a front seat of the automotive vehicle, e.g., where storage compartment 324 may be positioned rearward of a single row of seats of the automotive vehicle 302. In some examples, storage compartment 324 may be positioned longitudinally between two rows of seats of the automotive vehicle 302. In such instances the storage compartment 324 may further be positioned such that as least a portion thereof is positioned below a vehicle floor of the automotive vehicle, e.g., such that about one-half the vertical height of the storage compartment 324, or more, is positioned below a floor level of the automotive vehicle 324. In some examples, storage compartment 324 may be positioned in an automotive vehicle without seats (e.g., for driverless vehicles, or in an automotive vehicle with only a single driver seat.

Figure 4:
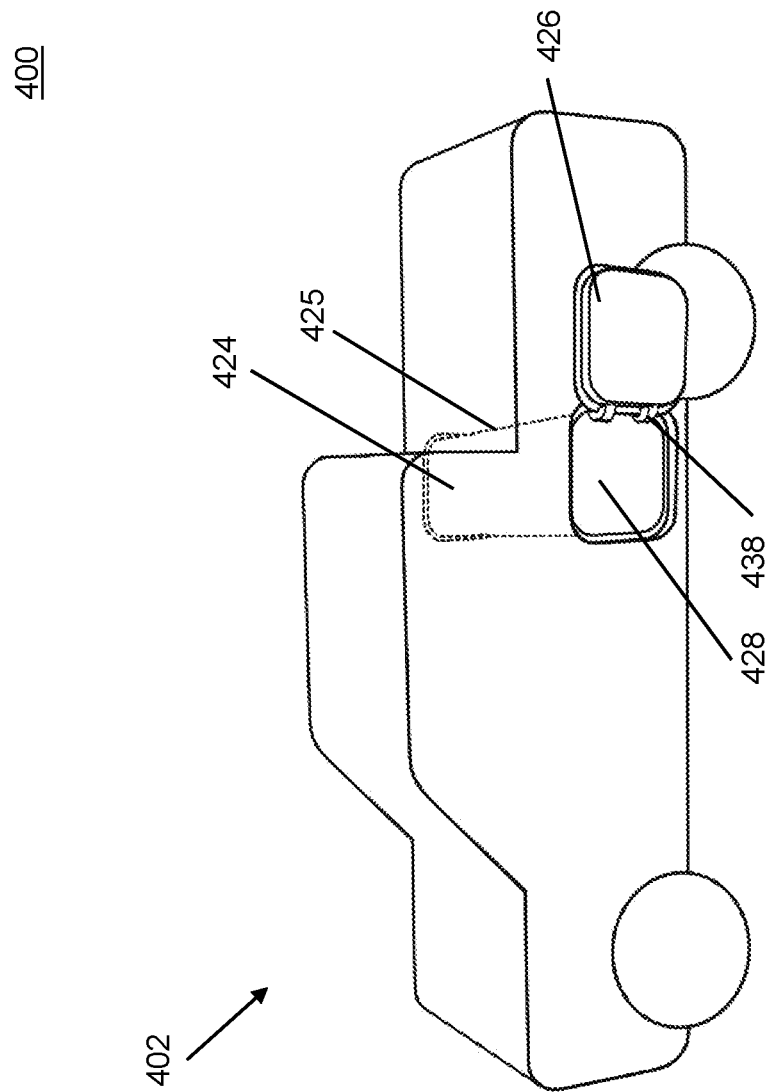
FIG. 4 is a diagram illustrating an example of a vehicle with a side-access storage compartment having a hinged door.

FIG. 4 is a diagram 400 illustrating an example of a vehicle with a side compartment having a hinged door. Vehicle 402 may have a storage compartment 424. Storage compartment 424 may include at least one sidewall 425 enclosing an interior portion of the storage compartment 424 and extending from a first side panel at a first (e.g., left) side of the automotive vehicle to a second side panel at a second (e.g., right) side of the automotive vehicle. Storage compartment 424 may have one or more openings 428. Each opening 428 may have a storage compartment door 426. Mechanism 438 allows for opening and closing of the storage compartment door 426. In the example illustrated in diagram 400, mechanism 438 may be a hinge or a set of hinges. Storage compartment door 426 may be open in such a way that maintains an upright, vertical orientation such that its surface that faces the opening 428 when in a closed position, faces outward, i.e., away from the vehicle, when in an open position. Storage compartment door 426 may open toward the rear of the vehicle, or toward the front of the vehicle, or up (toward the top of the vehicle), or down (toward the bottom of the vehicle).

Figure 5:
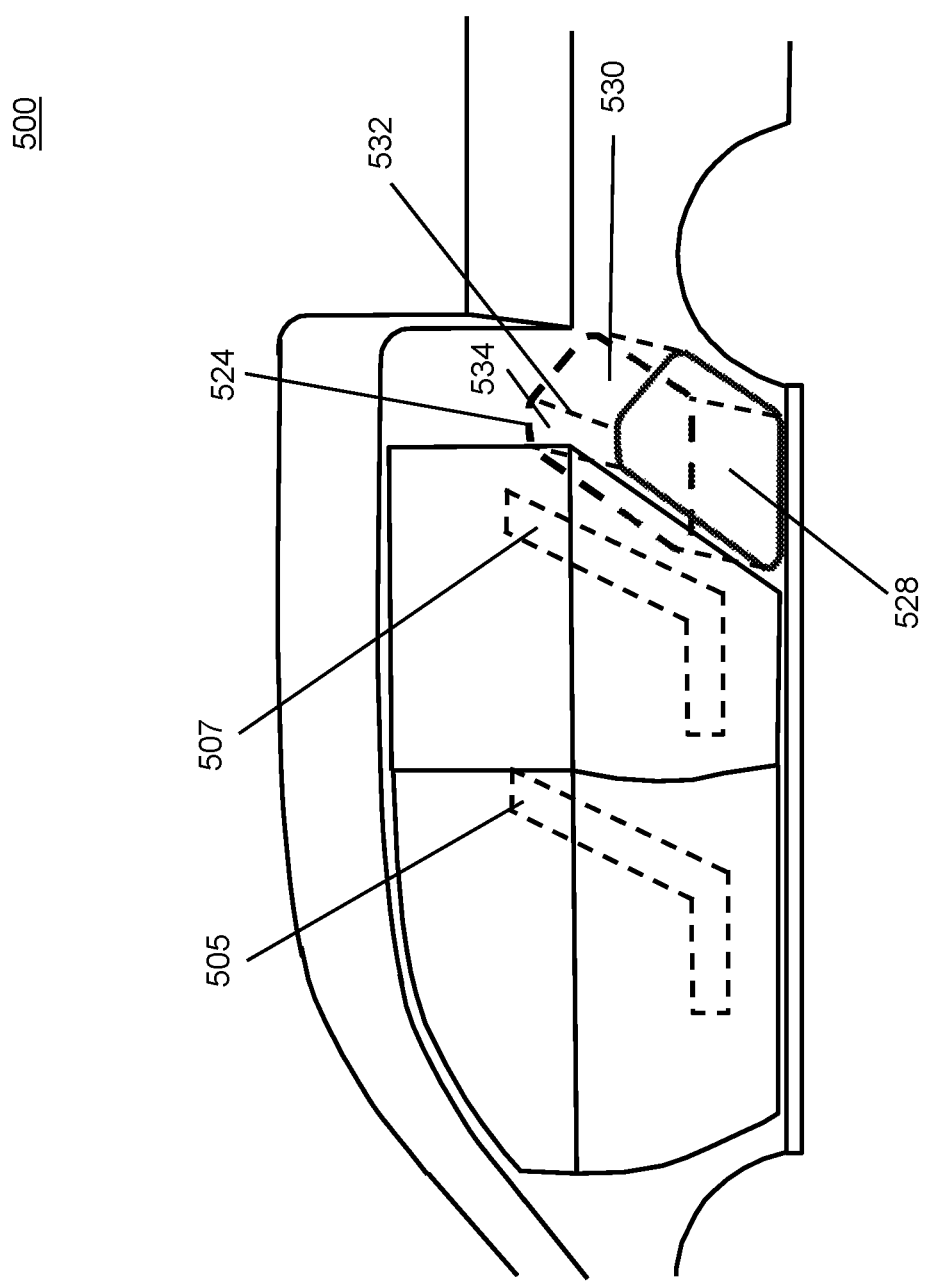
FIG. 5 is a diagram illustrating an example of a side-access storage compartment structure.

FIG. 5 is a diagram illustrating an example 500 of a storage compartment structure. Storage compartment 524 may have a first opening 528 on the left side of the vehicle. Storage compartment 524 may have a second opening 534 on the right side of the vehicle. Storage compartment 524 may have one or more sidewalls 530. Sidewall(s) 530 may be a continuous wall that is entirely curved in cross section, a continuous wall that includes both curved portions and straight portions in cross section, or a continuous wall with straight and/or curved portions in cross section with defined edges between sidewalls. In examples, the sidewall(s) may be composed of several pieces of panel material assembled together. If wall 530 is composed of several pieces, they may be connected together by welding, or with fasteners, or by glue, or using another means of connecting components. Sidewall(s) 530 may be made out of plastic, metal alloy such as steel sheet or aluminum alloy sheet or the like, composite materials, or other suitable material. Sidewall(s) 530 may be fabricated by stamping and bending the material into a suitable shape and joining the material at the edges, extruding the material, or by any other suitable approach or combination of processes. Sidewall(s) 530 may have one or more corner regions 532. Alternatively, sidewall(s) 530 may have a smooth surface, such that it has no abrupt corners. In examples, sidewall(s) 530 is smooth and without gaps or corners in circumferential direction. In examples, the sidewall(s) 530 may be configured in cross section such that adjacent portions of sidewall(s) transition one to the other with a radius of curvature no less than 4 inches where the corner region supports an extruded weather-strip seal and no less than 0.5 inches where the corner supports a molder weather-strip seal. In some examples, the storage compartment may be shaped in cross section in a substantially rectangular shape, e.g., square shape, such as shown in FIG. 1 for instance. In other examples, the storage compartment may be shaped in cross section in an asymmetric shape, e.g., a polygon shape with no right angles between one sidewall portion and an adjacent sidewall portion and with one sidewall that is longer in cross section than the rest of the sidewalls, such as illustrated in the example of FIG. 5. Such a storage compartment 524 with a polygon shape in cross section may have 4, 5, 6 or more sidewall portions that include straight portions, with or without abrupt corners therebetween. Dimensions of the storage compartment may include nominal height, width, and depth in the following ranges: height 10-30 inches, width 10-30 inches, depth 30-80 inches. These dimensions are exemplary, and the storage compartment is not limited to these dimensions.

Figure 6:
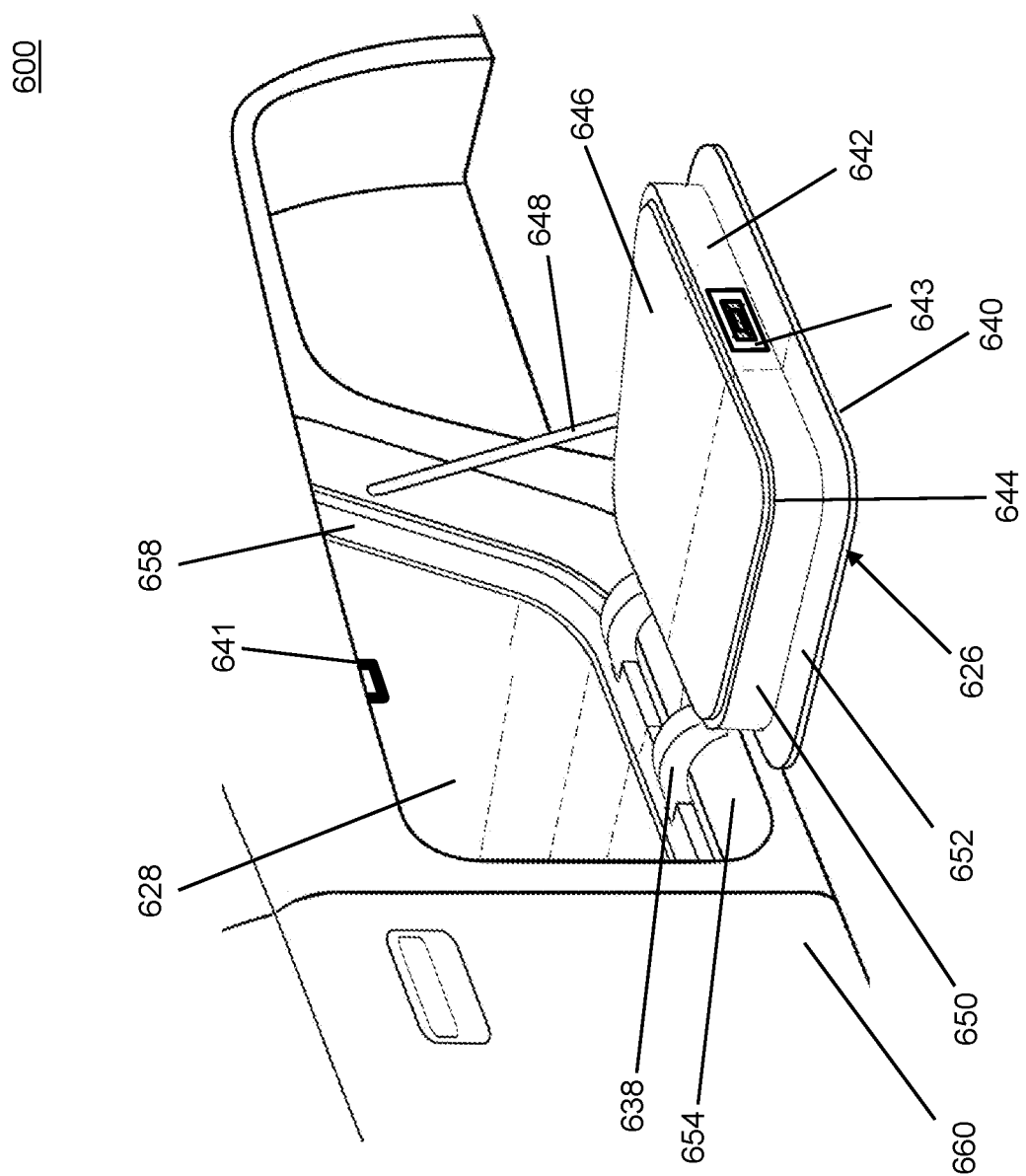
FIG. 6 is a diagram illustrating an example of a side-access storage compartment door in an open position providing a step function.

FIG. 6 is a diagram illustrating an example 600 of a storage compartment door (or side bin door) in an open position providing a horizontal step surface. Example 600 shows a storage compartment opening 628 and a storage compartment door 626. In this example, storage compartment door 626 opens downward, toward the bottom of the vehicle. A movement of the storage compartment door 626 between its closed position to its open position may be provided by one or more hinges 638 attached to both the vehicle and the door 626. In examples, there are two or more hinges 638. Storage compartment door 626 may have an outer door panel 640. Door panel 640 may have an internal surface 652 and an external surface (not shown). Storage compartment door 626 may have a door housing 642, and door housing 642 may have door side surface 650. Storage compartment door 626 may have a door seal 644 and a step surface 646. The door 626 may be secured in a closed position by a latch mechanism including a body side latch part 641 and a door side latch part 643, as illustrated schematically in FIG. 6. Any suitable latching mechanisms known in the art may be used in this regard. In some examples, step surface 646 faces up when storage compartment door 626 is in an open position. Storage compartment door 626 may be designed such that its capable of being opened downward such that a planar major surface thereof (e.g., surface 646) is substantially parallel to a ground surface (i.e., to within about ±10 degrees of a horizontal direction) or opened to the side such that a planar major surface thereof is substantially perpendicular to a ground surface (i.e., parallel to within about ±10 degrees of a vertical direction) depending upon the placement of hinges 638 that connect the door 626 to a body portion 660 of the vehicle body.

When storage compartment door 626 is in a closed position, external surface of the door panel 640 may be flat with the side of the vehicle. In a closed position, door side surface 650 may fit inside vehicle side opening 654. Vehicle side opening 654 may have a surface 656, such that there is a small gap between surface 656 and door side surface 650 when storage compartment door 626 is in a closed position. When storage compartment door 626 is in a closed position, door seal 644 may seal a gap between storage compartment door 626 and a storage flange 658. Such seal may be designed to prevent access of moisture or other contaminants into the storage compartment when storage compartment door 626 is closed.

Storage compartment door 626 may be further connected to the vehicle chassis with a door strap 648 that may limit the travel of the door 626 and/or reduce a load on the hinges 638 if a load is placed on the storage compartment door, such as a human stepping on the step surface 646. Door strap 648 may be made out of plastic, or metal, or cable, or other suitable material. Storage compartment door 626 may be supported by one or several door straps 648. Storage compartment door 626, and the associated opening mechanism (e.g., hinge mechanism) may be constructed of strong materials such as steel or aluminum alloy or other suitable material so as to withstand heavy loads of, e.g., 300 lbs, 400 lbs, 500 lbs, or more, which may be placed on the storage compartment door in its open position when used as a step or other support surface. In some examples a door cable 648 may be connected to a motorized closing mechanism pulls the cable over a pulley (not shown) at the vehicle chassis.

Storage compartment door 626 may be designed to serve as a seat as well as a step when in its open position. For example, the door 626 may be configured such that the step surface 646 will be positioned at a comfortable distance from the ground (e.g., 12-18 inches) for a typical sitting adult when storage compartment door 626 is in its open position and such that the width and depth of the step surface 646 can comfortably accommodate a sitting adult; eliminating sharp edges and corners from the surfaces of the storage compartment door 626 to avoid injuring a sitting person.

Configuring the storage door 626 such that the step surface 646 is at a height of 12-18 inches from ground when in the open position provides a useful step height such that the person standing on it may comfortably reach the roof of the vehicle to place an item on the roof or to remove an item from the roof The step surface 646 also provides a convenient means such that a person stepping on it also may comfortably reach to remove or place items in a cargo bed of the vehicle. The step surface 646 also provides a convenient means such that the person standing on it may comfortably step into or out of the cargo bed of the vehicle. Step surface 646 can be a non-skid surface. Step surface 646 can be a rubberized surface, or an abrasive non-skid surface.

Storage door 626 may be designed, depending on the need of a vehicle user, to open either downward such that the step surface 646 is substantially horizontal (i.e., parallel to the ground surface) when storage door 626 is fully open, or sideways such that the surface 646 is substantially vertical (i.e., perpendicular to the ground surface) when storage door 626 is fully open.

Figure 7:
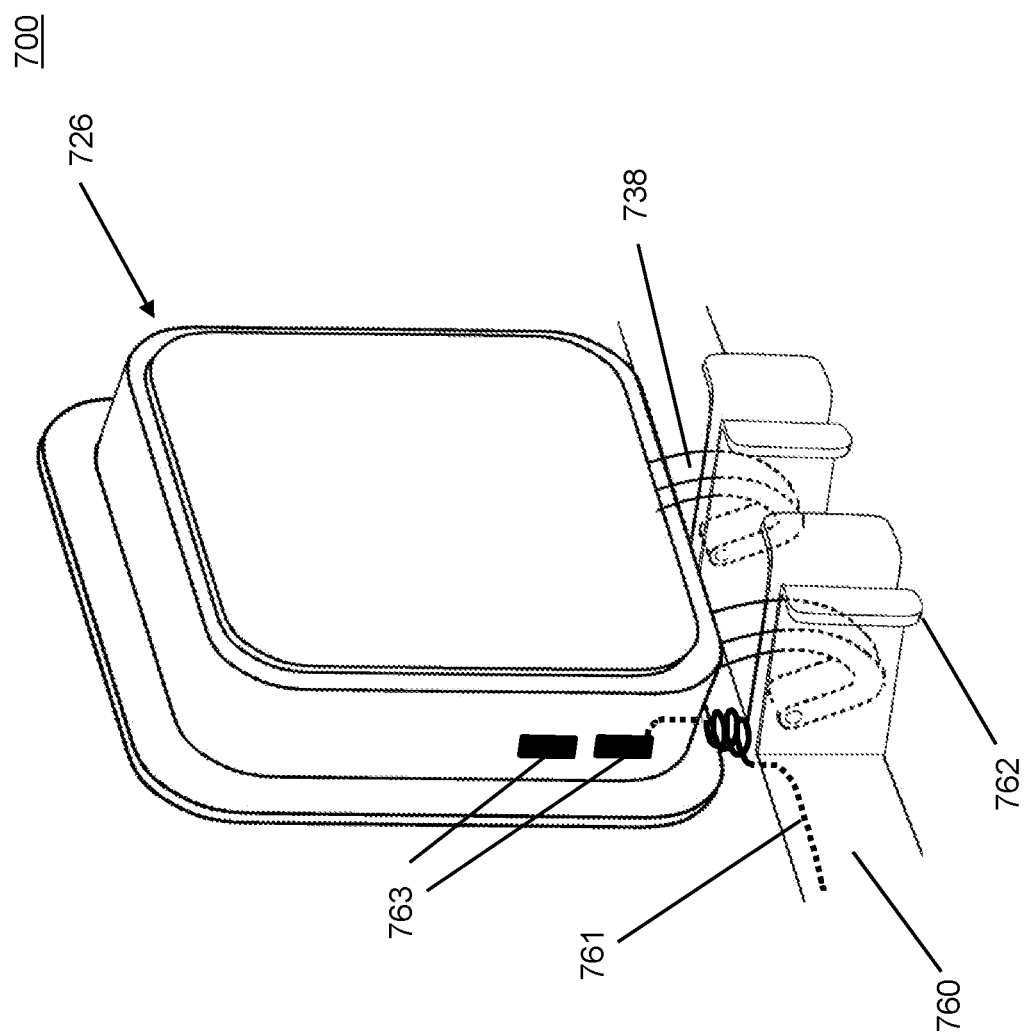
FIG. 7 is a diagram illustrating an example of a side-access storage compartment door in a closed position.

FIG. 7 is a diagram illustrating an example 700 of a storage compartment door in a closed position to seal against a vehicle side panel (not shown). In a closed position, storage compartment door 726 may be vertical. Storage compartment door 726 may move between an open and closed positions using one or more hinges 738. In an example, there are two hinges 738. Hinges 738 may be supported by hinge brackets 762. Hinge brackets 762 may be attached to a chassis rail or unibody portion 760. Storage compartment door 726 may be equipped with a wiring harness 761. Storage compartment door 726 may be equipped with one or more sensor devices 763, e.g., such as magnetic sensing devices or sending devices, or other sensors, to detect open and/or closed door position. Sensor devices 763 may be in electrical communication with the wiring harness 761. In some examples, the sensor devices 763 may be magnets that may trigger corresponding mating magnetic detection sensors located at a predetermined position at a vehicle wall that corresponds to the location of the magnets when the door is in a closed position, and in such a situation, the wiring harness 761 may be placed at the vehicle wall instead of at the storage compartment door 726.

Figure 8:
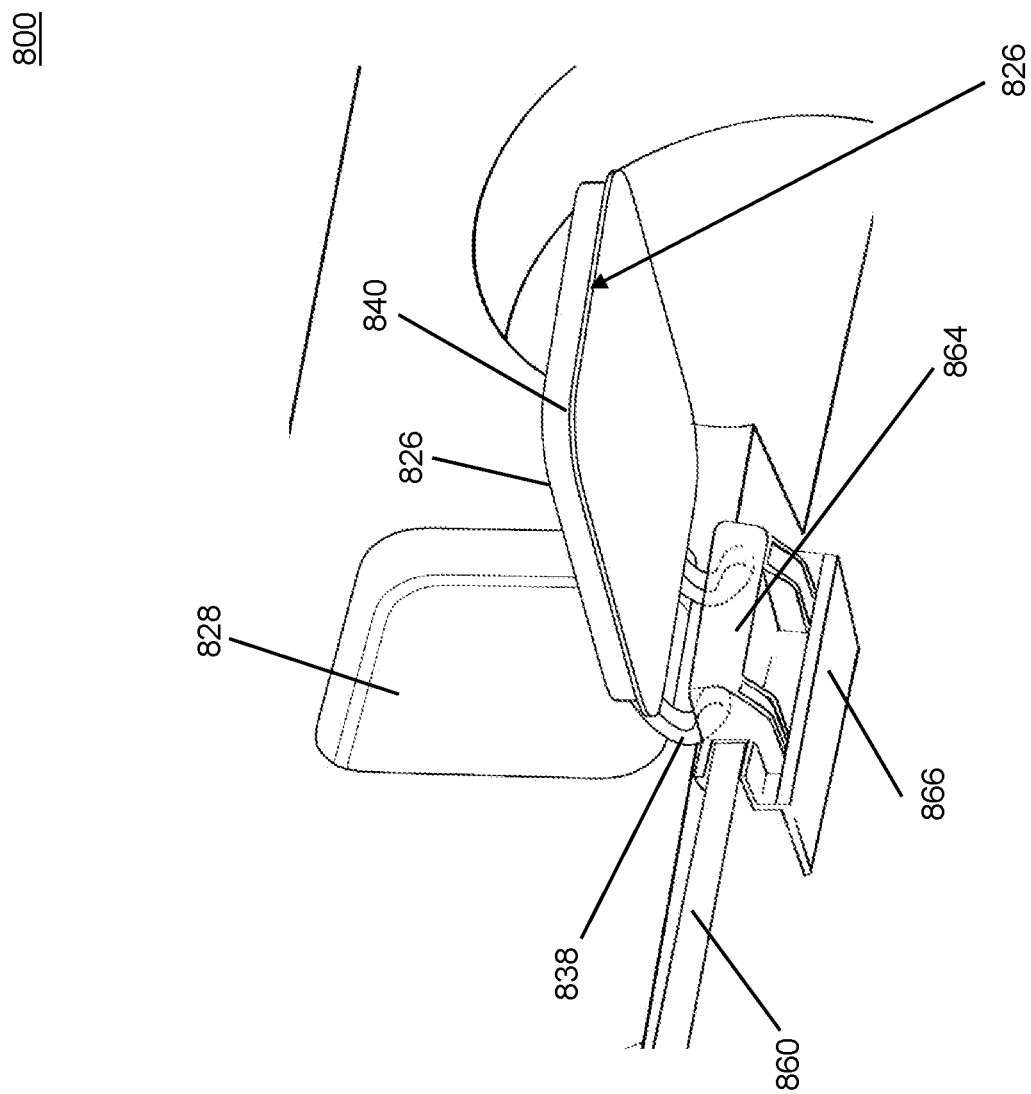
FIG. 8 is a diagram illustrating an example of a side-access storage compartment door connection to vehicle.

FIG. 8 is a diagram illustrating an example 800 of a storage compartment door connection to vehicle. In this example, storage compartment door 826 may be connected to the vehicle using one or more hinges 838. In an example, there are two hinges 838. Hinges 838 may be supported by a hinge support member 864. Hinge support member 864 may be connected to and supported by a hinge support bracket 866. Hinge support bracket 866 may be attached to a chassis rail or unibody portion 860. In an open position, storage compartment door 826 may uncover storage opening 828. In a closed position, storage compartment door 826 may close storage opening 828 such that door panel 840 may be in proximity with storage opening 828.

Figure 9A:
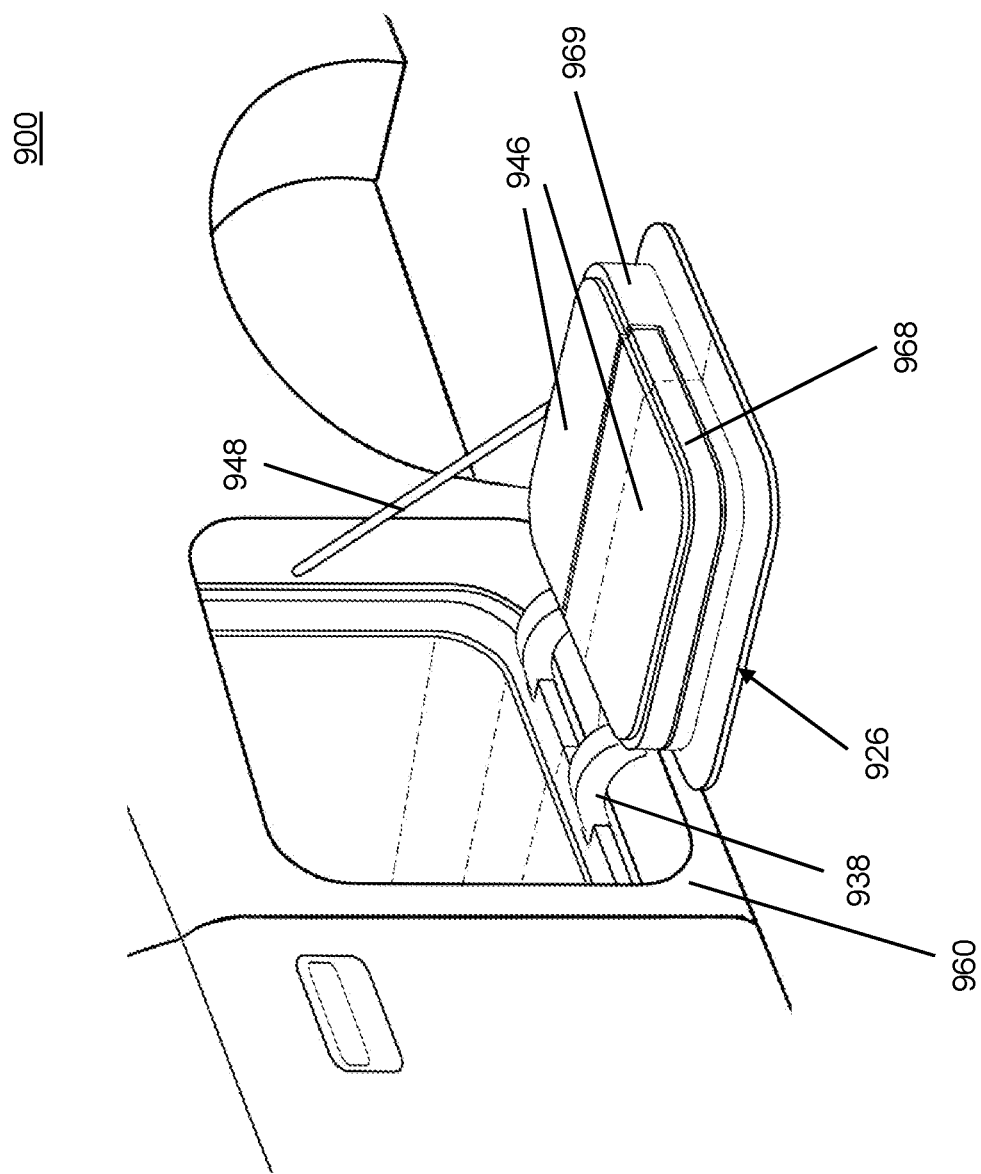
FIGS. 9A and 9B are diagrams illustrating an example of a side-access storage compartment door in an open position with a second step.
Figure 9B:
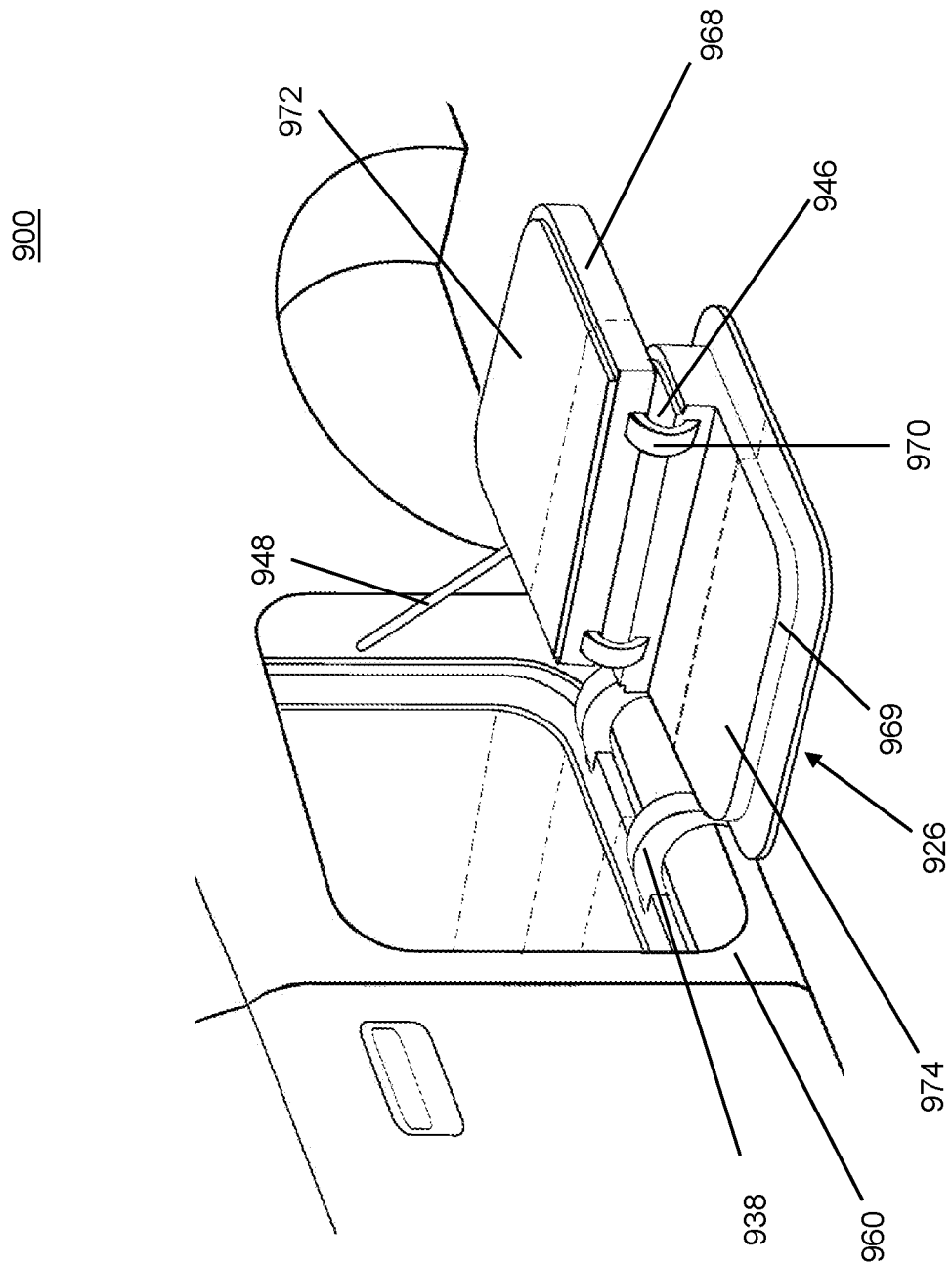

FIGS. 9A and 9B are diagrams illustrating an assembly 900 of a storage compartment door in an open position with a second step in a closed position. In this example, storage compartment door 926 is connected to a body portion 960 of the automotive vehicle via one or more hinges 938 and moves between its open and closed positions using the one or more hinges 938. In examples, there may be two or more hinges 938. In this example, storage compartment door 926 may have a second step member 968 movably attached, e.g., with a hinge mechanism, to a fixed step member portion 969. Diagram 900 shows storage compartment door 926 in an open position and second step member 968 in a closed (down) position such that a stepping surface 946 thereof is even with a stepping surface 946 of fixed step member portion 969. An exemplary hinge (970 in FIG. 9B) is hidden when the storage compartment door 926 is in an position and when the second step member 968 is in the closed (down) position shown in FIG. 9A. A cable 948 or door strap may be attached at one end to the storage compartment door 926 and connected at another end thereof to the vehicle chassis to limit the travel of and support the storage compartment door 926. In some examples cable 948 may be connected to a motorized closing mechanism pulls the cable over a pulley (not shown) at the vehicle chassis.

FIG. 9B shows the storage compartment door 926 in an open position and a second step member 968 in an open position. Second step member 968 may move between its open and closed positions using rails, or hinges, or another suitable mechanism. In this example, the second step member 968 can be moved by a user between its open and closed positions using one or more hinges 970. In examples, there are two or more hinges 970. When the second step member 968 is in an open (up) position, storage compartment door 926 may provide two step surfaces—a first step surface 974 and a second step surface 972, both of which may be suitable for sitting or standing or supporting items. In such a position, step surface 946, which was available for stepping, sitting, supporting, etc., with the position shown in FIG. 9A, is inaccessible for stepping, sitting, supporting, etc., with the position shown in FIG. 9B.

The second step surface 972 may be advantageously configured to be higher (farther above ground) than the first step surface 974. The higher second step surface 972 may allow a more convenient platform to reach or place items on the roof of the vehicle, or in a cargo bed. Having two step surfaces 972 and 974 when storage compartment door 926 is in its open position may also provide advantages of providing more support surfaces on which to place items, permitting two people to sit on the storage compartment door, and providing an easier path for stepping from the ground into cargo bed. In some examples, the storage compartment door 926 may be configured with three steps, whereby a third step member may be attached to the second step member 968 with hinges such as discussed above.

Figure 10B:
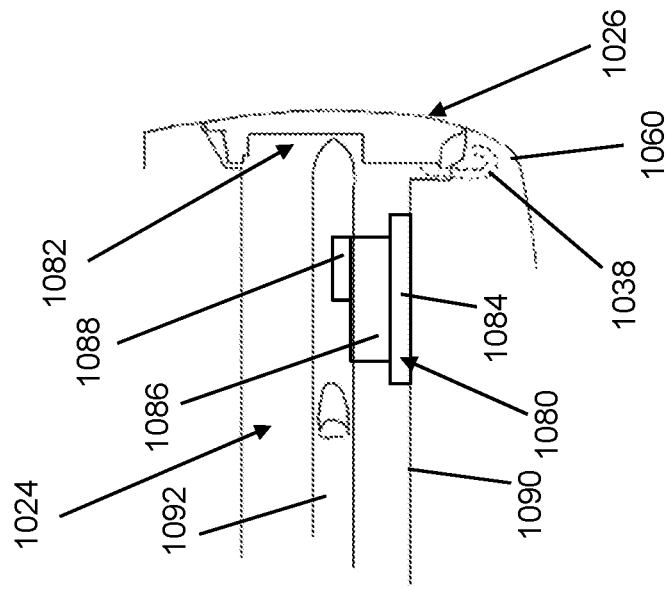
FIGS. 10A-10C are diagrams illustrating another example of a side-access storage compartment door with a removable insert to facilitate storage of lengthy items in the storage compartment.
Figure 10A:
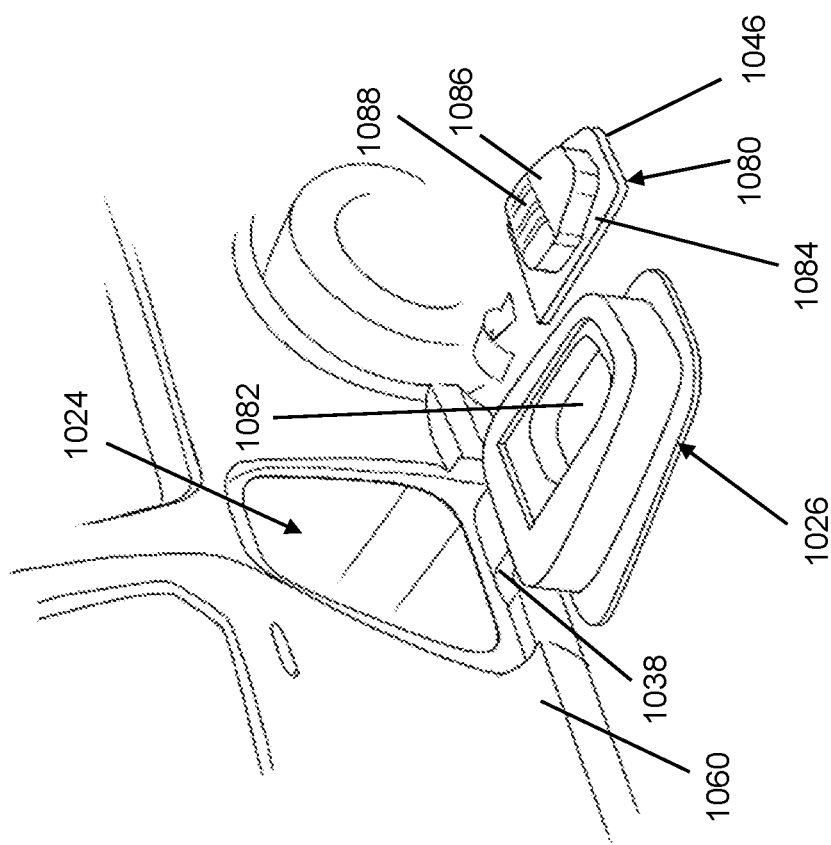

FIGS. 10A-10B are diagrams illustrating an assembly 1000 of a storage compartment door 1026 in an open position wherein the storage compartment door 1026 includes an insert 1080 that covers a cavity 1082 in the door 1026 and for which the insert 1080 can provide a positioning mechanism for articles being carried in the storage compartment 1024. FIG. 10A is a perspective view, and FIG. 10B is a cross-sectional view taken in along vertical plane and extending in a lateral direction along a length of the storage compartment 1024 from a left side of the vehicle to the right side of the vehicle with the storage compartment door 1026 in a closed position. In this example, storage compartment door 1026 moves between its open and closed positions relative to body portion 1060 using one or more hinges 1038. The exemplary storage compartment door 1026 includes an insert 1080 that, when attached to the door 1026, covers the cavity 1082. The insert 1080 may include a first panel 1084, a second panel 1086 attached to the first panel, and one or more positioning members 1088. The shape of the first panel 1084 and second panel 1086 may be configured to mate with the shape of the cavity 1082. When the insert 1080 is attached to the storage compartment door 1026, and when the storage compartment door 1026 is down in an open position (horizontal in this example), the exposed, upward-facing surface of first panel 1084 can serve as a step member on which a user can step to access a roof of the automotive vehicle or gain better access to a truck bed of the automotive vehicle. An exemplary hinge (970 in FIG. 9B) is hidden when the storage compartment door 926 is in an position and when the second step member 968 is in the closed (down) position shown in FIG. 9A. As shown in this example, the hinge(s) 1038 can be configured to be sufficiently strong and be limited in travel so that the storage compartment door 1026 can serve as a weight-bearing step, e.g., configured to support up to 500 pounds, without the need for a cable or door strap to limit the movement of the door 1026. In addition, a motorized opening and closing mechanism controlled by suitable switches, circuitry and wiring may be attached to the vehicle body and the door 1026 to open and close the door. In some examples, a cable or door strap (not shown) may be attached at one end to the storage compartment door 1026 and connected at another end thereof to the vehicle chassis to limit the travel of and support the storage compartment door 1026, such as described in connection with FIGS. 9A-9B. Suitable latching and locking mechanisms for permitting the door to open and securely close may be used as noted elsewhere herein.

As shown in the cross sectional view of FIG. 10B, the insert 1080 can be removed from the storage compartment door 1026, if desired, and placed onto a bottom surface 1090 of the storage compartment 1024 in order to support and secure one or more articles 1092 being carried in the storage compartment 1024. Such articles 1092 may be elongated, such as a snow ski (as illustrated in FIG. 10B), a piece of lumber, or other long item. Where the storage compartment 1024 includes two storage compartment doors 1026, one at each side (left and right) of the automotive vehicle, a second similar insert 1080 can be provided at the other side of the vehicle on the bottom surface 1090 of the storage compartment 1024. The insert(s) 1080 may be secured to the bottom of the storage compartment 1024 at predetermined locations using any suitable latches, slots, anchors, recesses, or other suitable way of securing the inserts 1080 to limit their movement and secure them in place. In addition, as shown in FIG. 10B, with the insert(s) 1080 secured to the bottom surface 1090 of the storage compartments 1024, the cavity 1082 is open an exposed, providing additional lateral space into which a lengthy article 1092 may extend. In fact, the lateral extent of the storage compartment 1024 (from the left side to the right side of the automotive vehicle) may span 180 cm or more, being limited by the ultimate width of the vehicle and the storage compartment door(s) 1026 as apparent from the discussion above.

Figure 10C:
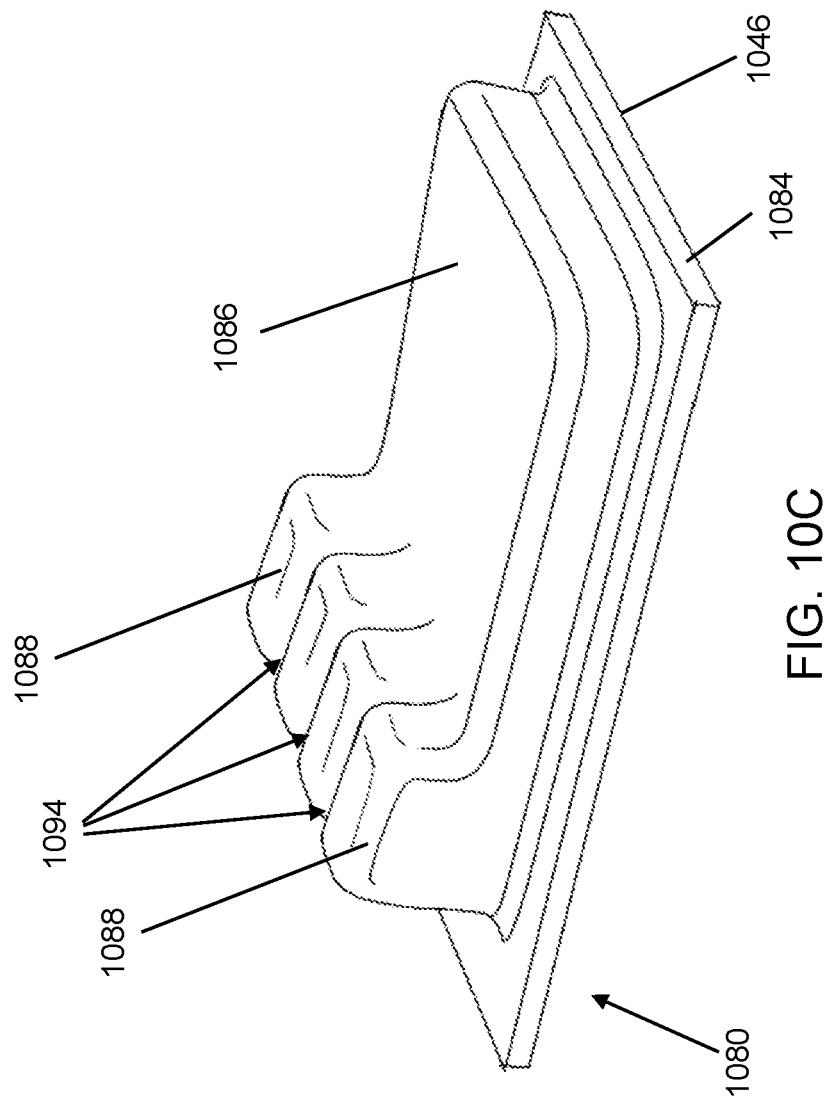

Exemplary aspects of the exemplary insert 1080 are further shown in FIG. 10C. As shown therein, the positioning members 1088 may be configured to extend from the plane of the second panel 1086, e.g., in the form of adjacent fingers between which are formed slots 1094 into which articles may be inserted to be secured when the insert 1080 is positioned at the bottom surface 1090 of the storage compartment 1024. In this regard, the positioning members 1088 (or fingers) may be formed of a resilient material that may deform and/or bend and/or be compressed, such as foam rubber, e.g., covered with a durable fabric or plastic covering. The positioning members 1088 may be formed integrally with the second panel 1086 such that both are made of the material(s), or the positioning members 1088 may be attached to the second panel 1086 using any suitable fastening mechanism, e.g., adhesives, clips, etc. Moreover, one or more of the positioning members 1088 may be removable from and reattachable to the second panel 1086 using any suitable attachment mechanisms (e.g., clips, slots, etc.) so as to provide flexibility in configuring the positioning members 1088 to accommodate articles of different sizes.

Figure 11:
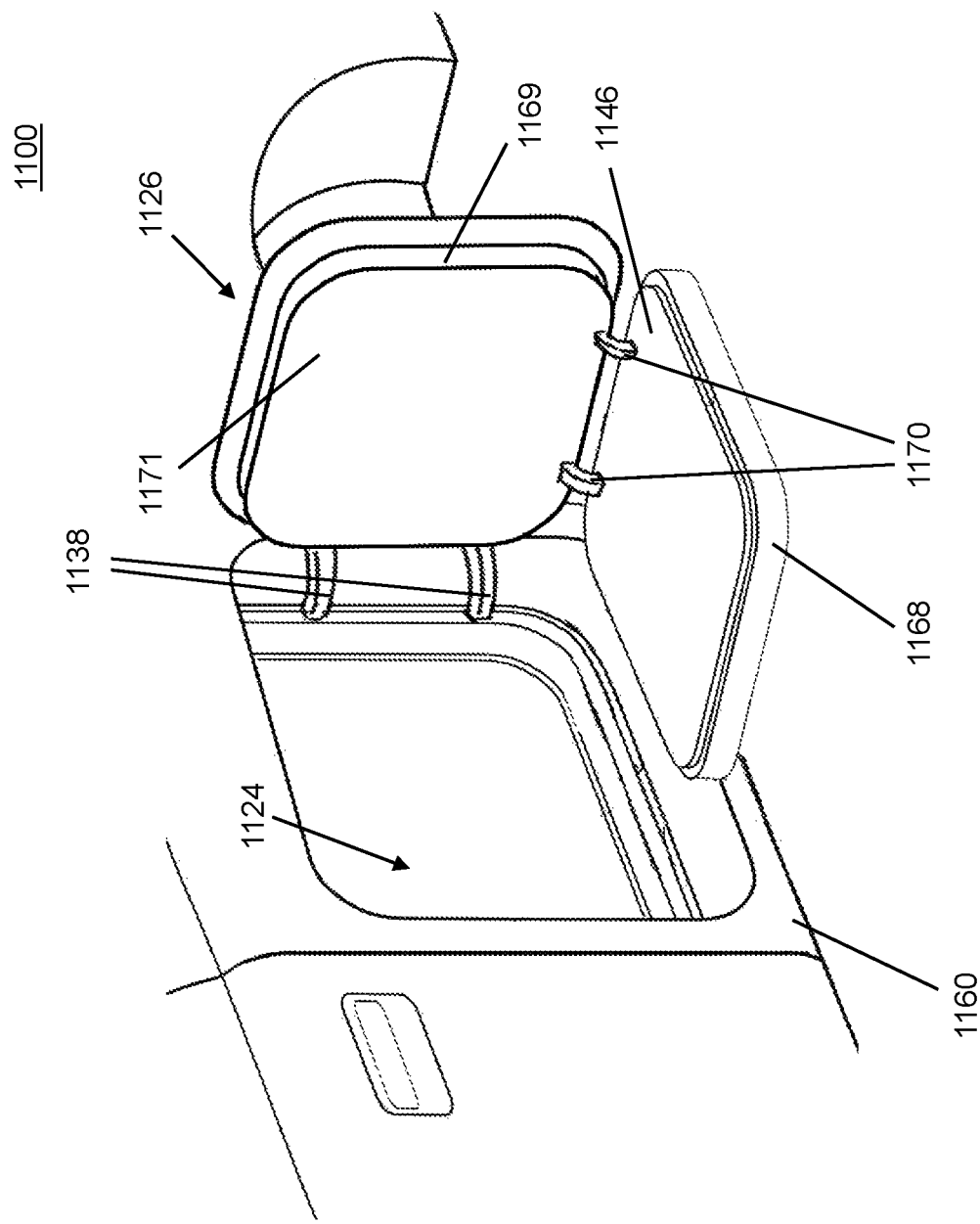
FIG. 11 is a diagram illustrating an example of a side-access storage compartment door in an open position with a door that opens sideways via a first hinge and with a step that folds downward from the compartment door via a second hinge.

FIG. 11 is a diagram illustrating another exemplary assembly 1100 of a side-access storage compartment door in an open position. In the example of FIG. 11, a storage compartment door 1126 includes a first member 1169 (door member) connected to a body portion 1160 of an automotive vehicle via one or more hinges 1138 and that opens sideways via the one or more first hinges 1138 exposing the storage compartment 1124. The exemplary storage compartment door 1126 also includes a second member 1168 (step member) that folds downward from the door member 1169 of the compartment door 1126 via one or more second hinges 1170. The step member 1168 includes a step surface 1146 that is oriented substantially horizontally when the step member 1168 is folded down to provide a convenient stepping surface for a user. The door member 1169 also includes a surface 1171 that is oriented substantially vertically, so as to be substantially perpendicular to the step surface 1146. As such, when the door member 1169 is open and when the step member 1168 is folded down, the combination of the door member 1168 and step member 1169 can be configured as a seat for a user, such that the step surface 1146 provides a horizontal seating surface and the surface 1171 provides a vertical back-support surface for the user. As with other examples herein, surfaces 1146 and 1171 may be made of any suitable materials such as rubber, polymer materials, composites, etc., and the step surface 1146 may be configured as a non-skid surface, e.g., roughened or patterned with grooves or the like to provide secure footing for a user. In other respects, other structural and functional features of door members and step members of a side-access storage compartment door described herein are applicable to the example of FIG. 11.

Figure 12:
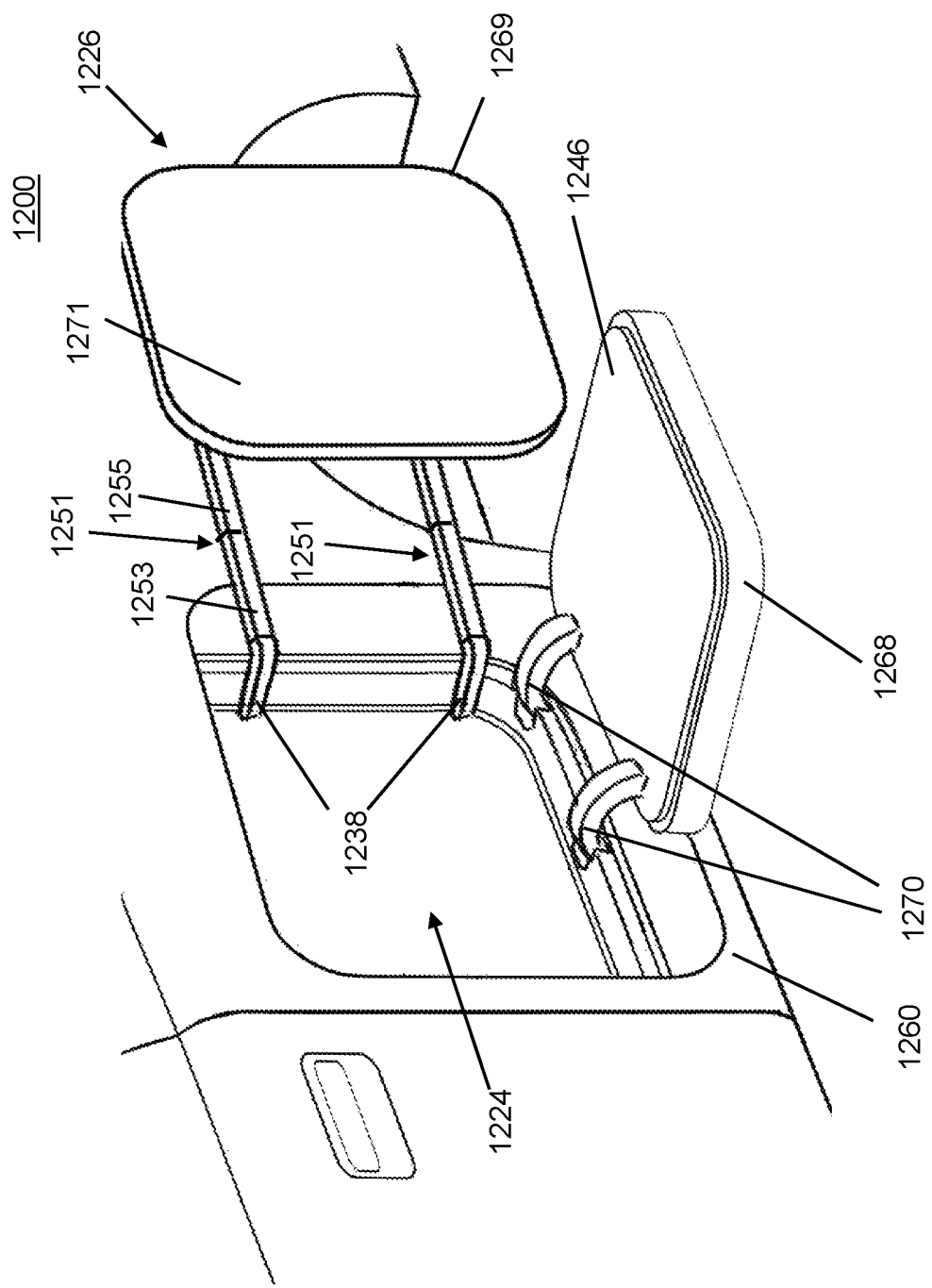
FIG. 12 is a diagram illustrating an example of a side-access storage compartment door in an open position with a door that opens sideways via a combination of a first hinge and a sliding mechanism and with a step that folds downward from a body of the automotive vehicle via a second hinge.

FIG. 12 is a diagram illustrating another exemplary assembly 1200 of a side-access storage compartment door in an open position. In the example of FIG. 12, a storage compartment door 1226 includes a first member 1269 (door member) that opens sideways via one or more first hinges 1238 in combination with one or more sliding rail members 1251, each of which includes a first rail 1253 and a second rail 1255, exposing the storage compartment 1224. In this example, exemplary storage compartment assembly also includes a second member 1268 (step member) that folds downward from a body portion 1260 of the automotive vehicle via one or more second hinges 1270. In this example, the second rail 1255 slides relative to the first rail 1253, and the second rail 1255 is additionally connected to a rear surface of the door member 1269 via one more third hinges (hidden in FIG. 12). Through the combination of the first and third hinges and the first and second rails 1253 and 1255, the door member 1269 is configured to swing and slide open relative to the body portion 1260. The step member 1268 includes a step surface 1246 that is oriented substantially horizontally when the step member 1268 is folded down to provide a convenient stepping surface for a user. A major surface 1271 of the door member 1269 is oriented substantially vertically when the door member 1269 is both open or closed, so as to be substantially perpendicular to the step surface 1246. As with other examples herein, surface 1246 may be made of any suitable materials such as rubber, polymer materials, composites, etc., and the step surface 1246 may be configured as a non-skid surface, e.g., roughened or patterned with grooves or the like to provide secure footing for a user. In other respects, other structural and functional features of door members and step members of a side-access storage compartment door described herein are applicable to the example of FIG. 12.

Figure 13:
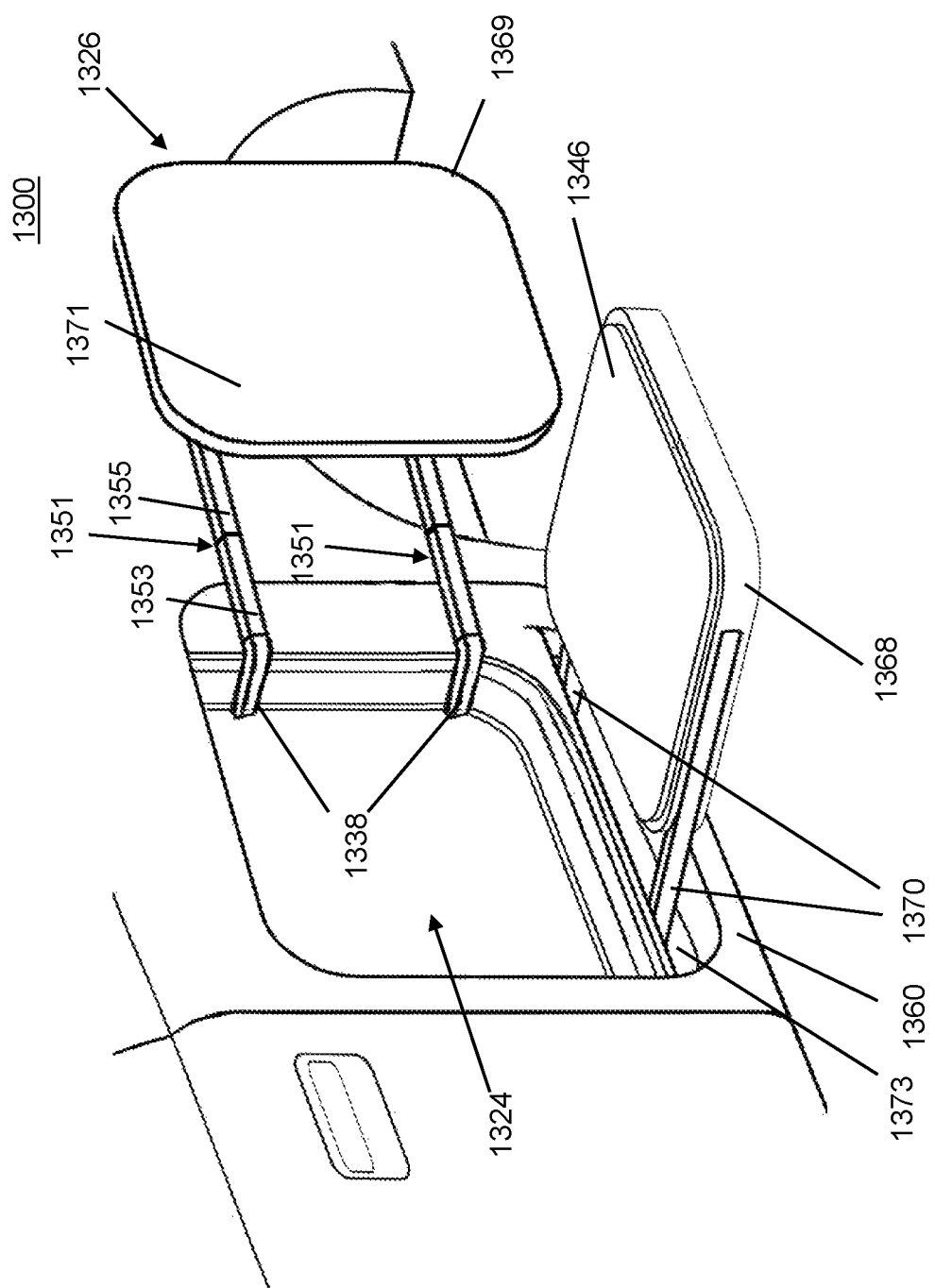
FIG. 13 is a diagram illustrating an example of a side-access storage compartment door in an open position with a door that opens sideways via a combination of a first hinge and a first sliding mechanism and with a step that slides outward from a body of the automotive vehicle via a second sliding mechanism.

FIG. 13 is a diagram illustrating another exemplary assembly 1300 of a side-access storage compartment door in an open position. In the example of FIG. 13, a storage compartment door 1326 includes a first member 1369 (door member) that opens sideways via one or more first hinges 1338 in combination with one or more sliding rail members 1351, each of which includes a first rail 1353 and a second rail 1355, exposing the storage compartment 1224, such as descried above in connection with FIG. 13. In this example, exemplary storage compartment assembly also includes a second member 1368 (step member) that slides outward from a body portion 1360 of the automotive vehicle via one or more third rails 1370 positioned in a slot 1373 of body portion 1360. In this example, the step member 1368 is configured to slide out of and back into slot 1373, relative to and along with the rails 1370 that support the step member 1368. In addition, the opening and closing of the door member 1369 is as described for the example of FIG. 12, wherein the second rail 1355 slides relative to the first rail 1353, and the second rail 1355 is additionally connected to a rear surface of the door member 1369 via one more third hinges (hidden in FIG. 13). Through the combination of the first and third hinges and the first and second rails 1353 and 1355, the door member 1369 is configured to swing and slide open relative to the body portion 1360. With the door member 1369 in an open position, the step member 1368 can be slid outward, e.g., via pulling outward with the hand of a user. In addition, the step member 1368 includes a step surface 1346 that is oriented substantially horizontally when the step member 1368 is slid outward to provide a convenient stepping surface for a user. A major surface 1371 of the door member 1369 is oriented substantially vertically when the door member 1369 is both open or closed, so as to be substantially perpendicular to the step surface 1346. As with other examples herein, surface 1346 may be made of any suitable materials such as rubber, polymer materials, composites, etc., and the step surface 1346 may be configured as a non-skid surface, e.g., roughened or patterned with grooves or the like to provide secure footing for a user. In other respects, other structural and functional features of door members and step members of a side-access storage compartment door described herein are applicable to the example of FIG. 13.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

What is claimed is:

1. A storage compartment assembly for an automotive vehicle, comprising:
    at least one wall connected to and extending from a side of a body of the automotive vehicle, the at least one wall enclosing a storage space, the side of the automotive vehicle located between a front of the automotive vehicle and a rear of the automotive vehicle, at least a portion of the storage space being positioned forward of a forward wall of a cargo space of the automotive vehicle;
    a first door configured to provide access to the storage space at the side of the automotive vehicle, the first door having a cavity formed therein, the cavity provided to add to the total volume of the storage space; and
    a removable insert at an interior side of the first door, the removable insert when attached to the first door covering the cavity,
    wherein the removable insert configured to be anchored within the storage compartment when removed from covering the first door cavity and the removable insert including positioning members configured to constrain movement of one or more articles carried in the storage compartment, and
    wherein the removable insert is configured to hold at least one pair of skis.

2. The storage compartment assembly of claim 1, the removable insert configured to be anchored within the storage compartment when removed from covering the first door cavity and the removable insert configured with positioning members to help maintain items from substantially moving within the storage compartment.

3. The storage compartment assembly of claim 1, wherein the first door is configured to be a weight-bearing horizontal step when open to facilitate access to a roof of the automotive vehicle.

4. The storage compartment assembly of claim 1, further comprising:
    a latch mechanism to secure the first door in a closed position.

5. An automotive vehicle, comprising:
    a cabin;
    a set of rear wheels located behind the cabin;
    a cargo space; and
    a closable storage compartment assembly located adjacent to the cabin, rearward of a rear-most seat of the automotive vehicle, and forward of the set of rear wheels, the closable storage compartment assembly comprising:

at least one sidewall enclosing an interior portion of a storage compartment, the at least one sidewall connected to a body of the automotive vehicle at a first side of the automotive vehicle and extending from the first side of the automotive vehicle toward a second side of the automotive vehicle, at least a portion of the storage compartment being positioned forward of a forward wall of the cargo space, a first opening to the storage compartment at the first side of the automotive vehicle, a first door with a first hinge at the first opening, wherein the first door comprises a first step member with a horizontal step surface when open, and a first hinge support bracket configured to provide support to the hinge and to the door when in the open position, the first hinge support bracket configured to provide sufficient support for the door to act as a weight-bearing step, wherein the first door further comprises a second step member configured to form a second step, the second step member configured to unfold from adjacency with the first step member.

6. The automotive vehicle of claim 5 wherein the first hinge support bracket is coupled to a chassis rail.

7. The automotive vehicle of claim 5, wherein the first hinge support bracket is coupled to a unibody portion of the vehicle.

8. The automotive vehicle of claim 5, wherein the first hinge support bracket protrudes from the first side of the vehicle below the first opening.

9. The automotive vehicle of claim 5, further comprising:
  a latch mechanism to secure the first door in a closed position.

10. The automotive vehicle of claim 5, wherein the first door is configured with a cavity formed therein, the cavity provided to add to the total volume of the storage space.

11. The automotive vehicle of claim 5, wherein the first door is configured with a cavity formed therein, the cavity provided to add to the total volume of the storage space and the first door is configured with a removable insert at an interior side of the first door, the removable insert when attached to the first door covering the cavity.

12. The storage compartment assembly of claim 11, wherein the removable insert configured to be anchored within the storage compartment when removed from covering the first door cavity.

13. The storage compartment assembly of claim 11, wherein the removable insert configured to be anchored within the storage compartment when removed from covering the first door cavity and the removable insert configured with positioning members to help maintain items from substantially moving within the storage compartment.

14. An automotive vehicle with a storage compartment, comprising:
  a cabin with roof;
  a set of rear wheels located behind the cabin;
  a cargo space; and
  a closable storage compartment assembly located adjacent to the cabin, rearward of a rear-most seat of the automotive vehicle, and forward of the set of rear wheels, the closable storage compartment assembly comprising:
    at least one sidewall enclosing an interior portion of a storage compartment, the at least one sidewall connected to a body of the automotive vehicle at a first side of the automotive vehicle and extending from the first side of the automotive vehicle toward a second side of the automotive vehicle, at least a portion of the storage compartment being positioned below the roof and at least a portion of the storage compartment being positioned rearward of a rear of the roof,
    a first opening to the storage compartment at the first side of the automotive vehicle,
    a first door with a first hinge at the first opening, the first door configured with a first portion and a second portion, the first portion configured to act as a horizontal platform when in an open position and the second portion configured to be in a vertical position when in the open position, the first door configured to provide sufficient support for the door to act as a weight-bearing seat with the first portion configured as a seat and the second portion configured as a seat back,
    wherein the second portion is coupled to the first side of the automotive vehicle by a hinge.

* * * * *